Patented July 31, 1945

2,380,618

UNITED STATES PATENT OFFICE 2,380,618

CATALYSTS FOR POLYMERIZATION REACTIONS

William D. Stewart and Benjamin M. G. Zwicker, Akron, Ohio, assignors to The B. F. Goodrich Company, New York, N. Y., a corporation of New York No Drawing. Application May 26, 1942,
Serial No. 444,596

14 Claims. (Cl. 260—84.5)

This invention relates to the polymerization of unsaturated organic compounds which are capable of undergoing an addition polymerization to form high molecular weight linear polymers, and particularly to the polymerization in the form of an aqueous emulsion of a butadiene-1,3 either alone or in admixture with a monomer copolymerizable therewith. The principal object of the invention is to provide a method for decreasing the time required to effect such polymerization reactions.

We have discovered that the time required to effect polymerization reactions may be decreased by polymerizing unsaturated organic compounds in the presence of a compound containing the group

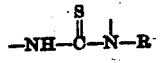

where R represents an acidic group. R may be any desired acidic group and may or may not form part of a ring structure. Groups containing a doubly or triply bonded carbon atom such as

or —C≡N connected to the nitrogen either directly or by a single carbon atom are preferred acidic groups. As examples of such compounds may be mentioned

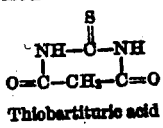
Thiobarbituric acid

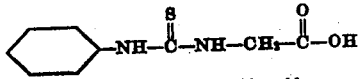
Phenylthiohydantoic acid

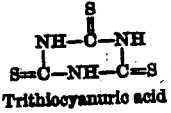
Trithiocyanuric acid

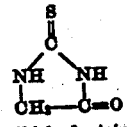
Thiohydantoin

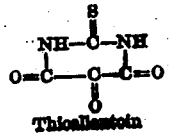
Thioallantoin

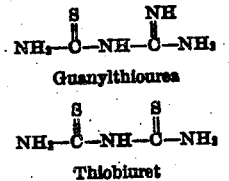
Guanylthiourea

Thiobiuret

Many other compounds containing the same characteristic grouping may also be employed as catalysts to speed up the polymerization.

The preferred methods of practicing this invention will be shown by the following specific examples which illustrate rather than limit the invention.

Example I

A mixture containing 12 parts by weight of butadiene, 4 parts of styrene, about 20 parts of a 3% aqueous solution of an alkyl benzene sulfonate, 0.23 part of Na₂HPO₄·12H₂O, 0.06 part of potassium persulfate, and 0.096 part of mixed higher aliphatic mercaptans with chains containing from 10 to 18 carbon atoms was agitated at 45° C. The polymerization required 44 hours to reach completion, but when 0.05 part of thiobarbituric acid was added at the beginning of the polymerization, the reaction was finished in 16 hours.

Example II

A mixture containing 12 parts by weight of butadiene, 4 parts of styrene, about 20 parts of a 4% aqueous solution of myristic acid which had been 95% neutralized with sodium hydroxide, 0.23 part of Na₂HPO₄·12H₂O, 0.06 part of potassium persulfate, and 0.072 part of diisopropyl dixanthogen were agitated at 50° C. The polymerization was only 5% complete in 13 hours, but when 0.025 part of thiobarbituric acid was added at the beginning of the polymerization, the reaction was 50% complete in 13 hours.

The catalysts of this invention may also be employed in conjunction with heavy metal compounds, in which case the polymerization proceeds more rapidly than when either catalyst is employed alone and the system will tolerate considerably higher proportions of heavy metal. The use of heavy metal compounds as catalysts is claimed in the copending application of William D. Stewart, Serial No. 379,712 filed February 14, 1941. As therein disclosed, the term heavy metal is used to signify metals which have a density greater than four, an atomic weight greater than forty and a low atomic volume (ratio of atomic weight to density) and consequently appear substantially at the minimum points above an atomic weight of forty on Lothar Meyer's atomic volume curve. The metals appearing in the center positions of the long periods of a periodic table arranged in long and short periods, and especially those which occur in the 6th to 12th positions of the long periods (considering the alkali metals to occupy the first position and all the rare earth metals to occupy a single position), that is the metals appearing in group VIII, subgroup B of groups I and II, and subgroup A of groups VI and VII are accordingly among the metals included in the term heavy metal. The metals of group VIII, particularly those occurring in the first long period, specifically iron, cobalt, and nickel, are preferred.

*Example III*

A mixture containing 6.6 parts by weight of butadiene, 5.4 parts of acrylonitrile, about 25 parts of a 2% aqueous solution of myristic acid which had been 85% neutralized with sodium hydroxide, and an activator made by dissolving in water 0.002 part of $CoCl_2 \cdot 6H_2O$, and 0.0002 part of $Fe_2(SO_4)_3 \cdot 7H_2O$ was agitated at 30° C. The polymerization was 30% complete in 5 hours, but when 0.05 part of thiobarbituric acid was added at the beginning of the polymerization, the reaction was 80% complete in 5 hours. The use of 0.05 part of phenylthiohydantoic acid in the above recipe also increased the rate of polymerization.

Although the preferred method of polymerization is by an emulsion polymerization as set forth in the specific examples, the catalysts herein described may be employed to accelerate the rate of polymerization in homogeneous systems in the presence or absence of solvents or diluents in the manners well known to the prior art.

The catalysts of this invention may be employed in widely varying proportions. The use of from 0.1 to 0.5% by weight based on the polymerizable materials ordinarily gives a pronounced catalytic effect. Noticeable effects are produced by the use of lower concentrations, although the optimum amount for the greatest catalytic effect is ordinarily above 0.1%. Greater amounts such as 1% or more can in general be employed, if desired, without any detrimental effects. Although less than 0.1% of heavy metal compound, preferably in the form of a water-soluble salt is ordinarily employed, the catalysts of this invention which form complexes with heavy metal compounds permit the use of a greater concentration of heavy metal than can be employed in the absence of any complex-forming compound. The complex-forming compound and the heavy metal compound may be added separately to the monomers prior to or during the polymerization, or may be reacted to form a heavy metal complex before they are added to the monomers.

The catalysts of this invention may be employed in the polymerization of any unsaturated organic compound which contain a

group and which are capable of undergoing an addition polymerization to form a high molecular weight linear polymer, that is, a polymer having a molecular weight of at least 10,000 and a substantially linear structure. Included in this class of monomers are the butadienes-1,3 such as butadiene-1,3, isoprene, 2,3-dimethyl butadiene, piperylene, and chloroprene; aryl olefins such as styrene, vinyl naphthalene, and alpha-chlorostyrene; acrylic and alpha-substituted acrylic acids, esters, nitriles, and amides such as acrylic acid, acrylonitrile, alpha-methacrylonitrile, alpha-chloracrylonitrile, methyl acrylate, methyl methacrylate, methacrylamide; vinyl halides, esters, ethers, and ketones such as vinylidene chloride, vinyl chloride, vinyl acetate, methyl isopropenyl ketone, and methyl vinyl ether. Any of the above compounds may also be copolymerized one with another. Butadiene, for instance, may be copolymerized with one or more monomers which enter into the polymeric chains by 1,2-addition such as acrylonitrile, styrene, methyl acrylate, etc.

As emulsifying agents which may be employed in emulsion polymerizations may be mentioned soaps such as sodium oleate, potassium palmitate, and sodium myristate, synthetic saponaceous materials including hymolal sulfates and alkaryl sulfonates such as sodium lauryl sulfate and sodium isopropyl naphthalene sulfonate, and salts of organic bases containing long carbon chains such as the hydrochloride of diethylaminoethyloleylamide, trimethylcetylammonium methyl sulfate, the hydrochloride of oleylamidoethyldimethylamine, and the hydrochloride of the diethylaminoethoethoxyanilide of oleic acid. The soaps are employed in polymerizations under basic conditions, the salts of organic bases under acid conditions, and the synthetic saponaceous materials under acid, alkaline, or neutral conditions.

The polymerization may be effected by various known initiators of polymerization such as percompounds including hydrogen peroxide, benzoyl peroxide, ammonium persulfate, potassium persulfate, and other peroxides and persalts such persulfates, perborates, percarbonates, and the like, as well as other types of initiators such as diazoaminobenzene, sulfur dioxide, hyposulfites, bisulfites, dipotassium diazomethane disulfonate, and triphenylmethylazobenzene. The polymerization, particularly if conducted homogeneously, may also be initiated by actinic radiation.

The plasticity and solubility of the polymers produced by homogeneous polymerizations may be increased by including in the charge chlorinated compounds such as carbon tetrachloride and trichloracetic acid, while a corresponding effect can be obtained in emulsion polymerizations through the use of sulfur-containing compounds such as the dialkyl dixanthogens, the higher tetraalkyl mono- and polysulfides, mercaptoalkylthiazoles, higher aliphatic mercaptans, etc.

Other methods and procedures known to be useful in connection with the polymerization of unsaturated organic compounds are within the spirit and scope of the invention as defined in the appended claims.

We claim:

1. The method which comprises polymerizing a butadiene-1,3 in aqueous emulsion in the presence of an organic compound containing a

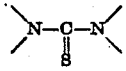

structure, said compound being selected from the class consisting of thiobarbituric acid, phenylthiohydantoic acid, trithiocyanuric acid, thiohydantoin, thioallantoin, guanylthiourea and thiobiuret.

2. The method of claim 1 further characterized in that a water-soluble heavy metal compound is present during the polymerization.

3. The method which comprises polymerizing a butadiene-1,3 in aqueous emulsion in the presence of thiobarbituric acid.

4. The method which comprises polymerizing in aqueous emulsion a mixture of butadiene and a monomer copolymerizable therewith in aqueous emulsion, in the presence of an organic compound containing a

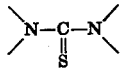

structure, said compound being selected from the class consisting of thiobarbituric acid, phenylthiohydantoic acid, trithiocyanuric acid, thiohydantoin, thioallantoin, guanylthiourea and thiobiuret.

5. The method of claim 4 further characterized in that a water-soluble heavy metal compound is present during the polymerization.

6. The method which comprises polymerizing in the form of an aqueous emulsion a mixture comprising butadiene and a monomer copolymerizable therewith in aqueous emulsion, in the presence of a mixture of thiobarbituric acid and a water-soluble salt of a heavy metal occurring in group VIII and the first long period of the periodic table.

7. The method which comprises polymerizing in the form of an aqueous emulsion a mixture comprising butadiene and acrylonitrile in the presence of thiobarbituric acid.

8. The method which comprises polymerizing in the form of an aqueous emulsion a mixture comprising butadiene and styrene in the presence of thiobarbituric acid.

9. The method which comprises polymerizing in aqueous emulsion a mixture comprising butadiene and acrylonitrile in the presence of phenylthiohydantoic acid.

10. The method which comprises polymerizing, in the form of an aqueous emulsion, a mixture of butadiene and acrylonitrile in the presence of a heavy metal complex containing a heavy metal occurring in group VIII and the first long period of the periodic table and thiobarbituric acid.

11. The method of claim 10 in which the heavy metal is iron.

12. The method of claim 10 in which iron and another heavy metal are employed.

13. The method which comprises polymerizing in aqueous emulsion a mixture of butadiene and styrene in the presence of a complex compound of a heavy metal occurring in group VIII and the first long period of the periodic table and thiobarbituric acid.

14. The method which comprises polymerizing in aqueous emulsion a mixture of butadiene and acrylonitrile in the presence of phenylthiohydantoic acid and a water-soluble salt of a heavy metal occurring in group VIII and the first long period of the periodic table.

WILLIAM D. STEWART.
BENJAMIN M. G. ZWICKER.